(12) United States Patent
Jain et al.

(10) Patent No.: US 7,031,887 B2
(45) Date of Patent: Apr. 18, 2006

(54) SYSTEM ARCHITECTURE SYNTHESIS AND EXPLORATION FOR MULTIPLE FUNCTIONAL SPECIFICATIONS

(75) Inventors: Rajiv Jain, Naperville, IL (US); Alan Peisheng Su, Westlake Village, CA (US); Chaitali Biswas, Los Angeles, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 887 days.

(21) Appl. No.: 09/918,734

(22) Filed: Jul. 31, 2001

(65) Prior Publication Data

US 2003/0028578 A1 Feb. 6, 2003

(51) Int. Cl.
*G06F 17/50* (2006.01)
(52) U.S. Cl. ............... 703/1; 716/1; 716/7; 716/18
(58) Field of Classification Search ............... 703/1; 716/7
See application file for complete search history.

(56) References Cited

U.S. PATENT DOCUMENTS

| 6,230,303 | B1 | 5/2001 | Dave |
| 6,289,488 | B1* | 9/2001 | Dave et al. ............... 716/1 |
| 6,305,006 | B1* | 10/2001 | Markov ............... 716/18 |

FOREIGN PATENT DOCUMENTS

| EP | 0682311 A2 | 5/1995 |
| EP | 1158405 A1 | 5/2001 |

OTHER PUBLICATIONS

Wolf, Wayne and Xie, Yuan; "Allocation and scheduling of conditional task graph in hardware/software co-synthesis", Mar. 2001, Proceedings of the conference on Design, Automation and Test in Europe, pp. 620-625.*

(Continued)

*Primary Examiner*—Paul L. Rodriquez
*Assistant Examiner*—Russ Guill

(57) ABSTRACT

A method is provided for exploring alternative architectures for partitioning computer system resources to execute multiple task specifications. An initial master task graph is formed from the multiple task specifications, the initial master task graph including at least one hierarchical task with pointers to either AND sub-task graphs or XOR sub-task graphs. The initial master task graph is processed to provide a selected number of final master task graphs, each of the final master task graphs comprising a list of AND task graphs. A family of architectures is generated for each of the final master task graphs, each of the architectures generated for a given master task graph being capable of executing every AND task graph included therein. The degree of resemblance in composition, functional capability or performance resulting between architectures from different master task graphs is a function of the correlation between the contents of these master task graphs and not of concern to the user of the aforementioned method.

14 Claims, 3 Drawing Sheets

OTHER PUBLICATIONS

Dick, Robert P. and Jha, Niraj K.; "MOGAC: A multiobjective genetic algorithm for the co-synthesis of hardware-software embedded systems", Nov. 1997, Digest of Technical Papers, 1997 IEEE/ACM International Conference on Computer-Aided Design.*

Kalavade, Asawaree and Subrahmanyam, P. A.; "Hardware/software partitioning for multifunction systems", Sep. 1998, IEEE Transactions on Computer-Aided Design of Integrated Circuit and Systems, vol. 17, No. 9.*

Kalavade, Asawaree; Subrahmanyam, P.A.; "Hardware/Software Partitioning for Multifunction Systems", IEEE Transactions on computer-aided design of integrated circuits and systems, vol. 17, No. 9, Sep. 1998.*

Search Report under Section 17, Dated Jan. 23, 2003.

* cited by examiner

SYSTEM ARCHITECTURE SYNTHESIS AND EXPLORATION FOR MULTIPLE FUNCTIONAL SPECIFICATIONS

BACKGROUND OF THE INVENTION

1. Technical Field of the Invention

The present invention generally pertains to a method or arrangement for synthesizing and exploring alternative system architectures executing the functional specification of a system in the form of a task graph. More particularly, the invention pertains to a method of the above type wherein each synthesized architecture must be able to execute all of the tasks in each of a plurality of task specifications. Even more particularly, the invention pertains to a method of the above type for synthesizing a large pool of architectures, and then identifying the better architectures therein with respect to prespecified criteria, in a comparatively short period of time.

2. Description of Related Art

As is well known in the art, a computer system typically has a large number and diversity of hardware and software resources that may be employed to execute or complete a particular task specification. An example of a task specification is a set of tasks that must be carried out in order to operate a cellular phone for wireless communication. Generally, many different combinations of hardware and software resources are available to execute a particular task specification, including combinations of only hardware resources, of only software resources, and mixtures of both types of resources. However, while the number of workable combinations may be quite large, some resource combinations are more useful than others; also some resource combinations may have undesirable characteristics or unintended consequences. The comparative merits of different resource combinations are generally determined by timing or other constraints imposed upon implementation of a set of tasks.

As is further known in the art, architecture space exploration is the process of mapping a task specification to a set of resources and time schedules, wherein the set of tasks in the specification may be represented as a graph of interrelated processes and communications. The set of resources comprises objects such as software, memory elements, special application specific integrated circuits (ASICs) and processors. Each solution provided by the mapping process has a corresponding architecture that incorporates a particular combination of resource components and that assigns respective tasks thereto. The architecture also schedules the timing of task completion. In the past, efforts were made to automate the process of selecting a suitable distribution of resources to define an architecture within the universe of possible architecture solutions known as the design space. Architecture synthesis algorithms were developed for automating the process of selecting the distribution of resources to define the architecture. In some cases the universe may include millions of possible architectures. Some of these efforts are described, for example, in "Research Strategies for Architecture Synthesis and Partitioning of Real-Time Systems," Jakob Axelsson, IDA Technical Report, 1996.

In certain important applications, it is necessary to provide an architecture that is capable of executing multiple specifications, wherein each specification is modeled as a task graph. The modeling of each specification as a task graph allows designers to implement a single architecture that must satisfy multiple task graphs. For example, in mobile communications an architecture may be required to execute both GSM (Global System Mobile communications) and CDMA (Code Division Multiple Access) protocols. Designing an architecture capable of executing both these protocols could be of considerable value. However, in order to provide such a capability it is necessary to (1) effectively model the multiple specifications and (2) determine how the architecture synthesis algorithm is to explore and generate architectures for multiple specifications.

In another situation pertaining to multiple task graphs, a designer having multiple choices for implementing a task may prefer to have an architecture synthesis tool select the best choice or choices for implementing the task. For example, a designer could prefer to let the architecture synthesis tool decide whether to use the MPEG-3 or the MPEG-4 encoding scheme for video telephony. In this situation, the final selected architecture only needs to support the execution of exactly one of these compression algorithm options. Accordingly, it would be very desirable to provide an architecture synthesis tool for exploring better possible architectures when there is a choice of task implementations, and then selecting the architecture that provides the best implementation. Again, the two main issues to address are the way to model the specification, and how the architecture synthesis algorithm uses the model for searching and generating the architecture.

SUMMARY OF THE INVENTION

The present invention is directed to a method for synthesizing and exploring alternative system architectures executing multiple functional specifications, each specification having the form of a task graph. An embodiment of the present invention comprises a method for generating computer system level architectures that are capable of executing multiple functional specifications within a set of predetermined physical resources and that are subject to a set of design constraints. The method for generating the computer system level architectures includes forming an initial master task graph from the multiple specifications. The master task graph has at least one hierarchical task that has pointers to a plurality of sub-task graphs. The master task graph also includes one or more AND or XOR attributes. The initial master task graph is processed to provide a selected number of final master task graphs. Each of the final master task graphs include a list of the AND task graphs. A family of computer system level architectures are then generated for each of the final master task graphs. Each of the generated computer system level architectures are capable of executing all the AND task graphs that are included in the final master task graph. The family of computer system level architectures are then explored to determine their usefulness in executing the multiple specifications.

Another embodiment of the present invention may be an article of manufacture that is capable of executing multiple functional specifications, given a set of resources, and subject to a set of design constraints. The article of manufacture may include a computer readable medium, such as a magnetic tape, a floppy disk, magnetic disk, read-only memory, digital disk memories, or other computer readable mediums. The article of manufacture also would include a plurality of instructions, such as a computer program, microprocessor/microcontroller instructions, etc. stored, at least in part, on the computer readable medium wherein the plurality of instructions are configured to cause a processor to form a master task graph from the multiple specifications. The master task graph includes at least one hierarchical task having pointers to a plurality of sub-task graphs, and one or more AND or XOR attributes. The plurality of instructions further cause the processor to process the intial master task graph to provide a selected number of final master task graphs. Each of the final master task graphs may comprise a list of AND task graphs. The plurality of instructions also cause the processor to generate a family of architectures for each of the final master task graphs. Each of the generated architectures are capable of executing every AND task graph included in the list for the given final master task graph. The plurality of instructions further cause the processor to explore each of the generated architectures for their actual abilities for executing the multiple specifications.

More specifically, the issue of modeling multiple specifications is first considered for the case where a single architecture must satisfy multiple task graph executions. An example of a single architecture that must satisfy multiple task graph executions is an architecture that is required to execute both GSM and CDMA protocols. In accordance with embodiments of the invention, it is desired to have an architecture synthesis engine that generates architectures which can execute two specifications, each specification will have a task graph such as TG1 and TG2. The user then creates a new task graph such as MGT, with one task in it. This task is a hierarchical task with pointers to TG1 and TG2 as its sub-task graphs, and has an attribute, referred to as an AND attribute, that tells the architecture synthesis engine to treat the sub-task graphs as multiple specifications. The AND attribute must be set by the user. Thus, MGT is sent to the engine for exploration of architectures and is referred to as a master task graph.

In a second case, where there are multiple architecture choices for implementing a task in a task graph. The, second case, multiple specification modeling is similar to the AND case, referred to above. For illustration it is assumed that there are two options, O1 and O2 for task T. Accordingly, T is a hierarchical task with O1 and O2 as its sub-task graphs. T has an attribute, referred to as an XOR attribute, that tells the architecture synthesis engine to treat the sub-task graphs as a multiple choice, that is, the final selected architecture need only support the execution of one of the sub-task graphs. For XOR sub-task graphs, the generated architectures must support the execution of at least one sub-task graph with or without supporting the executions of any other sub-task graphs at that level of hierarchy. Note that each XOR sub-task graph produces a separate master task graph. Each of the master task graphs can be explored individually and only the results need to be ranked collectively. After the master task graphs have been produced, they are each applied to an architecture synthesis engine. The architecture synthesis engine may be a processor implementing an algorithm to generate and explore respectively corresponding architecture families.

One embodiment of the invention is a method for exploring alternative architectures for executing multiple specifications. The method includes forming an initial master task graph from the multiple specifications. The initial master task graph includes at least one hierarchical task having pointers to a plurality of sub-task graphs, and one or more attributes that may be AND attributes, XOR attributes or both. The method further includes processing the initial master task graph to provide a selected number of final master task graphs, each of the final master task graphs comprising a list of AND task graphs, and generating a family of architectures for each of the final master tasks graphs, each of the architectures generated for a given final master task graph being capable of executing every AND task graph included in the list corresponding thereto. Each of the generated architectures is explored for use in executing the multiple specifications.

In another embodiment, each of the architectures generated for a given final master task graph is placed into a pool and a particular architecture is retained in the pool only if the particular architecture can execute each AND task graph of the given final master task graph in accordance with a prespecified time schedule. Preferably, respective architectures retained in the pool are evaluated by means of a fitness function and also by applying a convergence criteria to the architectures. Additional new architectures may be generated for the pool by applying a genetic algorithm to one or more previously generated architectures.

DETAILED DESCRIPTION OF THE EXEMPLARY EMBODIMENTS OF THE INVENTION

In accordance with the invention, a number of computer architectures are generated and explored. Each architecture must be capable of executing multiple specifications or task graphs. As used herein, as well as used generally in the art, a task graph is a functional specification that the resulting architecture must support. A task graph is characterized by a name, identifications and lists of tasks, parts and connections. Note that a computer architecture comprises various hardware and software components that are more easily selected by utilizing an embodiment of the present invention.

The user commences the architecture exploration process by creating a set of task graphs. Each task graph describes the functional behavior of one or more parts of the system or systems to be designed. Task graphs are described in a hierarchical fashion, where sub-task graphs may be related to each other by AND or XOR relationships. A hierarchical task having an AND attribute is hereinafter referred to as an AND hierarchical task, and its associated sub-task graphs are referred to as AND sub-task graphs. In like manner, a hierarchical task having an XOR attribute is hereinafter referred to as an XOR hierarchical task, and its associated sub-task graphs are referred to as XOR sub-task graphs.

After the set of task graphs are created, the task graphs are collectively combined into a user specification, or initial master task graph. The initial master task graph is passed to a preprocessor that resolves the hierarchy in the task graphs. For each XOR case, a final master task graph is created, as described in further detail in connection with FIGS. 1 and 2.

Figure 1:
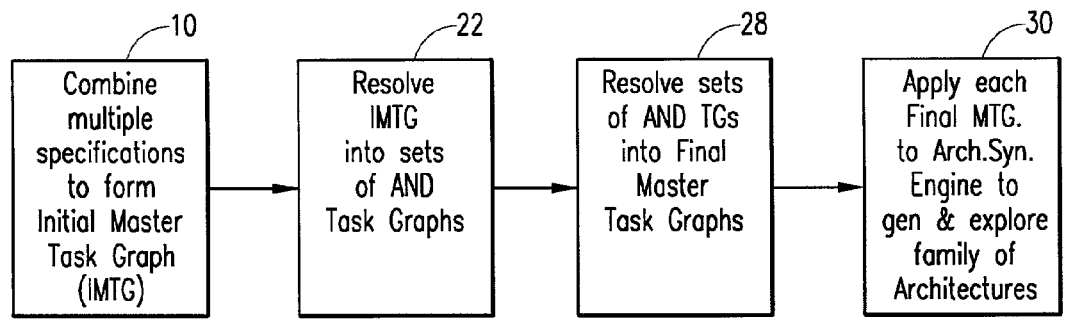
FIG. 1 is a block diagram illustrating modeling of multiple specifications for an embodiment of the invention.
Figure 2:
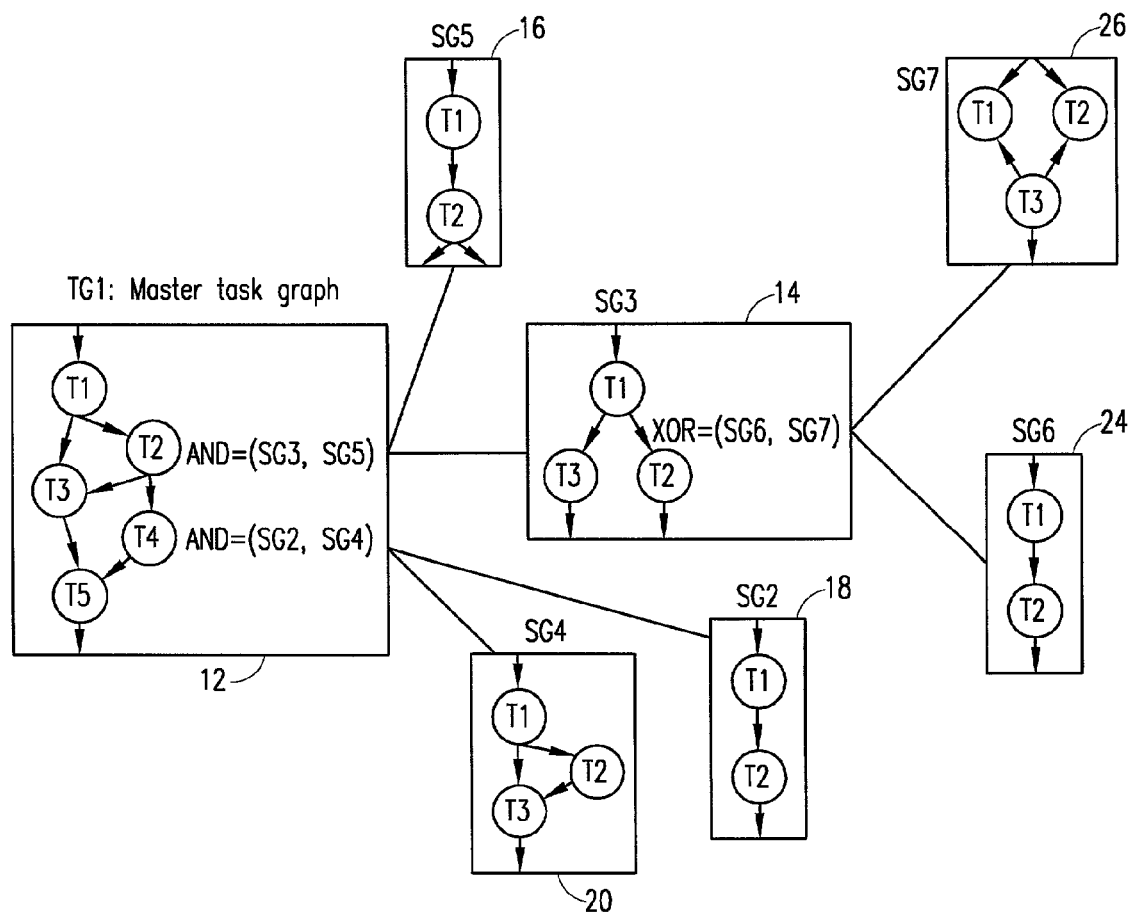
FIG. 2 is a schematic diagram showing a master task graph and its associated sub-task graphs for processing in accordance with an embodiment the invention.

Referring to FIGS. 1 and 2 together, there is shown a process block 10 depicting a process step wherein a user operating a processor combines multiple specifications together to form an initial master task graph, such as master task graph TG1 shown in block 12 of FIG. 2. Block 12 further shows an exemplary master task graph TG1 including interconnected tasks T1–T5, wherein task T2 is an AND hierarchical task with pointers to sub-task graphs SG3 and SG5. In a like manner, task T4 of master task graph TG1 is an AND hierarchical task with pointers to exemplary sub-task graphs SG2 and SG4. AND sub-task graphs SG3, SG5, SG2, and SG4 are depicted in FIG. 2 as blocks 14–20, respectively.

It is to be understood that since master task graph TG1 contains a number of AND hierarchical tasks, TG1 can alternatively be represented as a set of task graphs that incorporate different combinations of the AND sub-task graphs. Thus, by selectively processing the initial master task graph TG1, as shown by process block 22 of FIG. 1, TG1 can be resolved or flattened into first sets of AND task graphs TG1_1, TG1_2, TG1_3 and TG1_4, as follows:

TG1_1=TG1+SG3+SG2
TG1_2=TG1+SG3+SG4
TG1_3=TG1+SG5+SG2
TG1_4=TG1+SG5+SG4

It will be appreciated that respective first task graph sets TG1_–TG1_4 comprise different combinations of the AND sub-task graphs, together with the remaining tasks of initial master task graph TG1. It is appreciated further that exemplary architectures generated in accordance with an embodiment of the invention must be able to support execution of all AND task graphs in each first set.

Referring further to FIG. 2, there is shown task T2 of AND sub-task graph SG3 comprising an XOR hierarchical task with pointers to exemplary sub-task graphs SG6 and SG7, depicted in blocks 24 and 26, respectively, of FIG. 2. Accordingly, the first task graph sets TG1_1 through TG1_4 can be further resolved into second sets of AND task graphs TG1_1_1, TG1_1_2, TG1_2_1, TG1_2_2, TG1_3_1, and TG1_4_1, as follows:

TG1_1_1=TG1+SG3+SG6+SG2
TG1_1_2=TG1+SG3+SG7+SG2
TG1_2_1=TG1+SG3+SG6+SG4
TG1_2_2=TG1+SG3+SG7+SG4
TG1_3_1=TG1+SG5+SG2
TG1_4_1=TG1+SG5+SG4

As stated above, an architecture resulting from the exemplary architecture exploration and generation method and system must be able to execute all of the tasks associated with one sub-task graph of an XOR hierarchical task. However, the resulting architecture does not need to be able to execute tasks of other XOR sub-task graphs, since such tasks will not be needed if the particular architecture and its associated sub-task graph is ultimately chosen for use. Accordingly, respective AND task graphs of the second sets shown above must be regrouped or reordered into lists, on the basis of their respective corresponding XOR sub-task graphs. The process of reordering AND task graphs indicated by process block 28 of FIG. 1, provides two final master task graphs MGT1 and MGT2, each comprising a list of AND task graphs. More particularly, MGT1 comprises a list of all tasks associated with XOR sub-task graph SG6, and MGT2 comprises a list of all tasks associated with XOR sub-task graph SG7. Thus, MGT1=TG1_1_1, TG1_2_1, TG1_3_1, TG1_4_1, and
MGT2=TG1_1_2, TG1_2_2, TG1_3_1, TG1_4_1.

Referring further to FIG. 1, there is shown process block 30 indicating that respective task graphs of a final master task graph are applied or directed to an architecture synthesis engine, in order to generate and explore a corresponding family of partitioning architectures. An exemplary architecture synthesis engine in accordance with the present invention utilizes a microprocessor based device and related data storage apparatus. The combination of the microprocessor and storage apparatus allows an exemplary embodiment of the present invention to be stored in the storage apparatus such that the microprocessor is directed by the architecture synthesis engine. The architecture synthesis engine may comprise a processor utilizing software programmed to synthesize alternative architectures for executing a specification or set of tasks.

Figure 3:
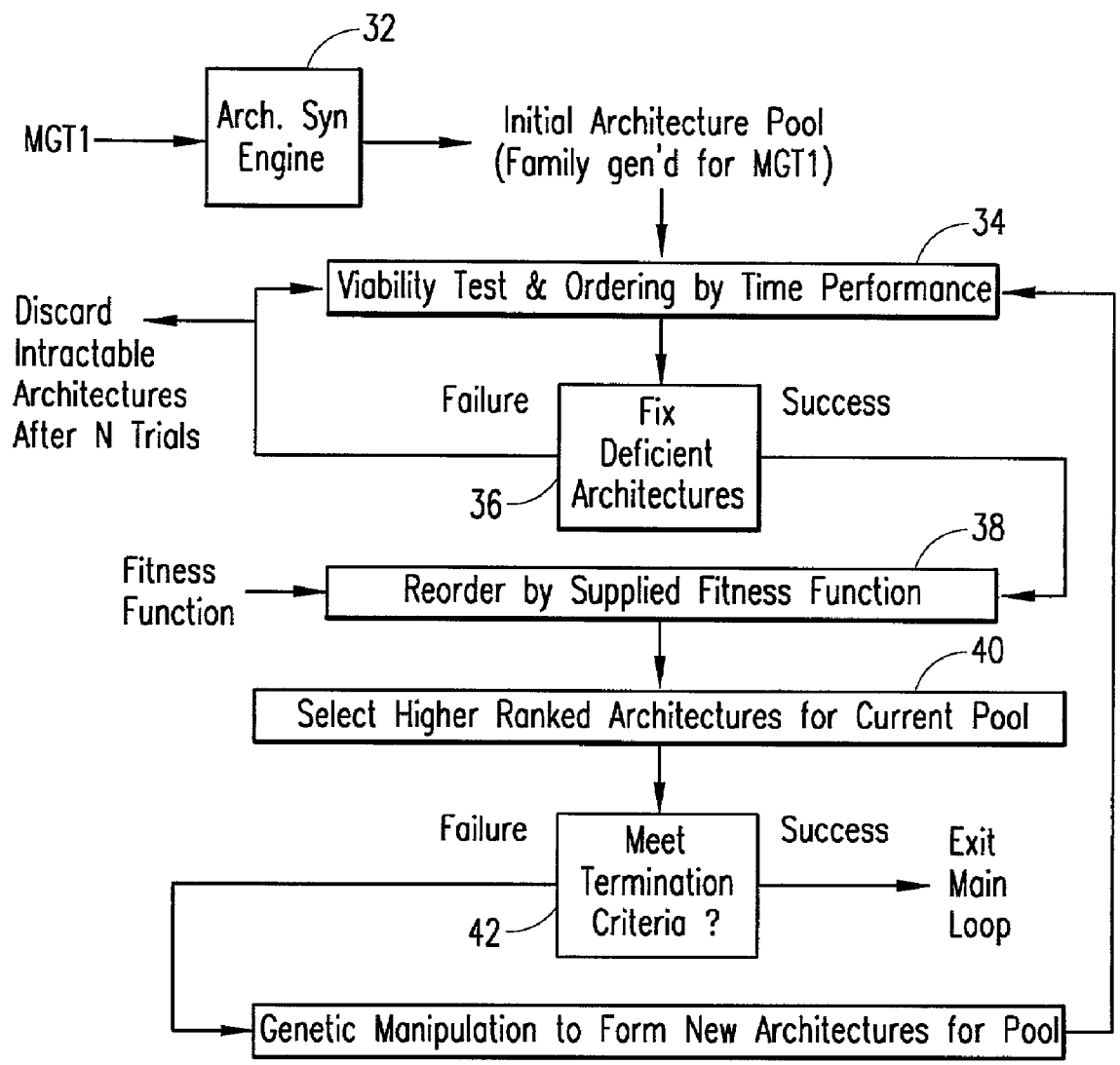
FIG. 3 is a flow chart showing an algorithm useful in exploring architectures for an embodiment of the invention.

After a family of architectures has been produced for a particular final master task graph, the family serves as an initial pool of system architectures. The suitability of these architectures, for executing respective task graphs of the particular final master task graph, is explored in a number of steps or stages, in accordance with an architecture exploration algorithm. A flow chart for such algorithm is depicted in FIG. 3. FIG. 3 shows architecture synthesis and exploration with respect to final master task graph MGT1, but is equally applicable to MGT2.

The architecture synthesis engine executes such process as follows: (1) read component library, design specifications and the master task graphs MGT1 and MGT2; (2) initialize the engine with parameters that dictate exploratory behavior and scope; and (3) for each master task graph generating a family of architectures, as described hereinafter in further detail.

Referring to FIG. 3, there is shown an architecture synthesis or partitioning engine 32 employed to provide an initial pool of architectures corresponding to master task graph MGT1. Connectivity is completed for each architecture in the pool. As indicated by process block 34, each architecture is then tested or evaluated to determine whether each architecture can comply with timing requirements. More specifically, a usable architecture must be able to execute the tasks of each listed AND task graph of MGT1, in accordance with time schedules respectively corresponding thereto.

If an architecture successfully complies with the schedules of all the AND task graphs, the architecture is moved through process block 36 to a process block 38, described hereinafter. Otherwise, a methodology is utilized at process block 36 to fix or adjust the architecture to comply with the schedule. The adjusted architecture is then routed back to process block 34 and reevaluated. This evaluation and adjustment cycle may be repeated a fixed number of times (N) for each architecture that did not initially comply with the schedules of the AND task graphs. After the Nth cycle, if the architecture is still unable to meet all time schedules for respective master task graphs, it is discarded and moved to a reject pool.

Referring further to FIG. 3, it is seen that architectures routed to process block 38 are respectively evaluated in accordance with a fitness function. The fitness function enables architectures to be given numerical values, to be compared with one another, and to be ranked. The fitness function may be designed to favor, for example, architectures that have lower power consumption requirements or fewer discrete components. The fitness histories of respective architectures are also recorded for use in ranking.

After the architectures have been evaluated and ranked in block 38, a specified number of the higher ranked architectures are selected for placement in a current architecture pool, as indicated by process block 40 of FIG. 3. The remaining unselected architectures may be moved to a reserve pool. For example, if one hundred architectures are evaluated at process block 38, the twenty most highly valued may be selected for placement in the current architecture pool.

At process block 42 the current architecture pool is checked for population fitness, convergence and other numerical termination criteria. If the termination criteria is met, the current pool architectures exit the main loop and may be displayed. If the termination criteria is not met, a genetic algorithm is employed to create new architectures for the current master task graph.

Figure 4:
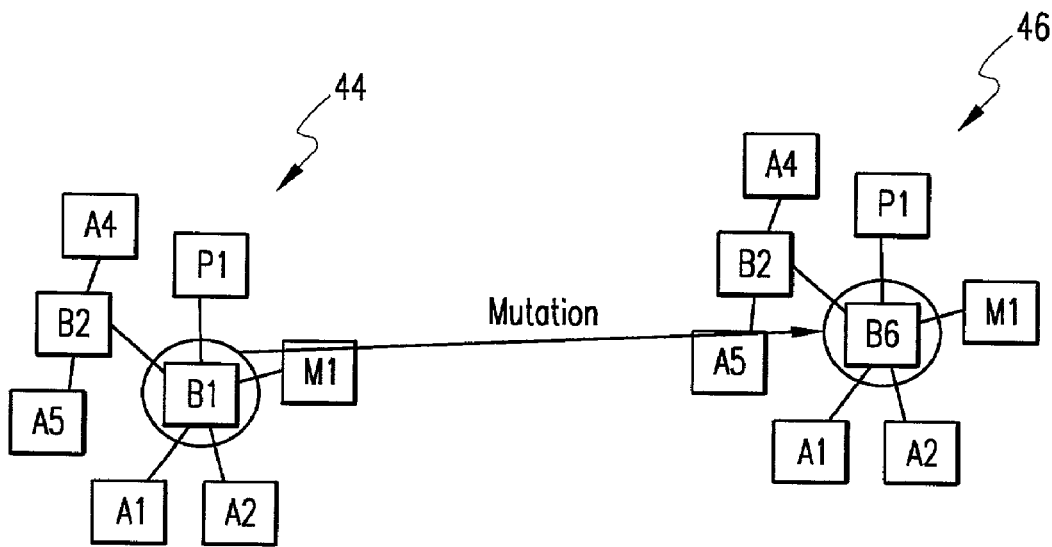
FIG. 4 is a schematic diagram illustrating genetic mutation for an embodiment of the invention.

FIG. 4 illustrates a type of genetic manipulation known as architecture mutation. In architecture mutations, an empty "temp" pool is initially created. One of the task graphs of MGT1 is randomly selected, and a task is randomly chosen therefrom. An architecture is randomly selected from the current pool, and an implementation of the chosen task is randomly selected to be a component in the selected architecture. If the selected component is different from the components previously used in the task implementation, the selected architecture is copied and changed to the new task-implementation mapping. The architecture so formed is added to the "temp" pool as a temp architecture. Thus, FIG. 4 shows a selected architecture 44 mutated to a temp architecture 46 by replacing the component B1 with the component B6. At the end of the mutation process all temp architectures in the newly created "temp" pool are added to the ones existing in the current pool.

Figure 5:
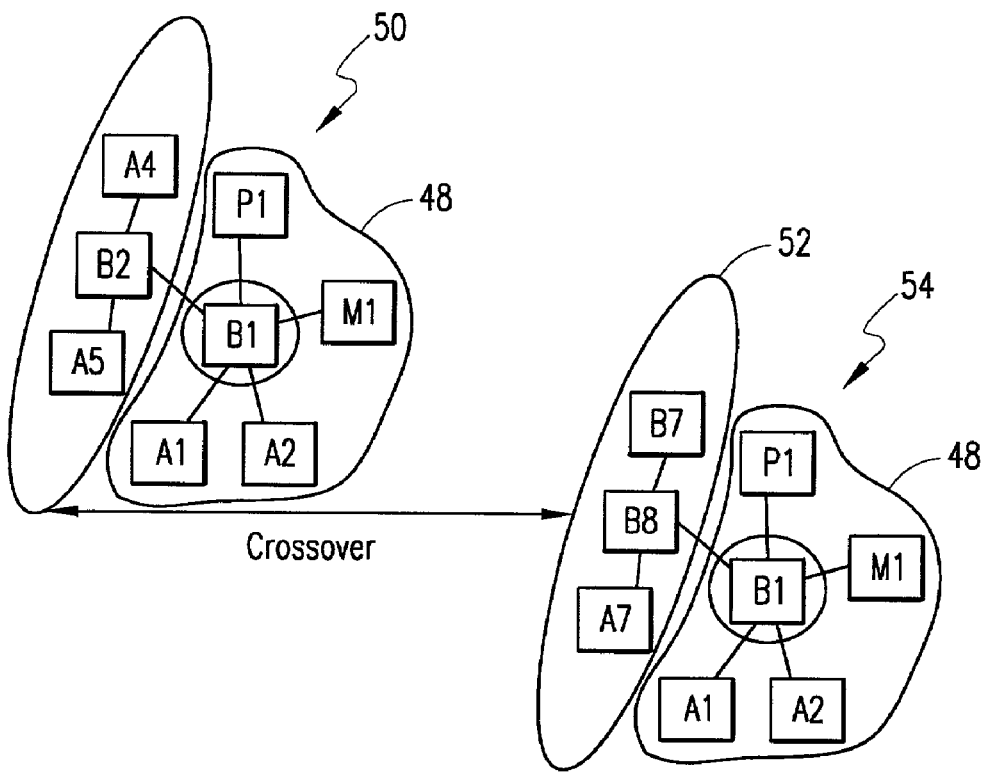
FIG. 5 is a schematic diagram illustrating genetic crossover for an embodiment of the invention.

FIG. 5 illustrates a second type of genetic architecture manipulation known as crossover. In accordance therewith, a task graph of MGT1 is randomly chosen. A random number of architectures that are less than or equal to half the number of architectures in the current pool is selected. Each selected architecture is then randomly paired with another selected architecture to form a parent pair, each member of the pair referred to as a parent. For each parent pair, a task position in the list of tasks of the chosen task graph is randomly selected, and the implementation of the task is switched between the parents of the pair. This gives rise to two new children architectures that are added to the "temp" pool. Thus, FIG. 5 shows a component 48 of a parent 50 joined with a component 52 of another parent (not shown) to produce a child 54. At the end of the crossover process all new architectures in the newly created "temp" pool are added to the ones existing in the current pool.

In a third type of genetic architecture manipulation, an architecture is randomly selected from the current pool, and a functional block is randomly selected from the selected architecture. All functional blocks in the selected architecture that are duplicates of the randomly selected functional block are randomly merged. Associated task mappings are merged to create a new architecture, which is added to the current pool.

Obviously, other modifications and variations of the present invention are possible in light of the above teachings. It is therefore to be understood that within the scope of the disclosed concept, the invention may be practiced otherwise than as specifically described.

We claim:

1. A method for generating computer system level architectures that are capable of executing multiple functional specifications, given a set of physical resources, and subject to a set of design constraints, the method comprising:

forming an initial master task graph from said multiple specifications, said initial master task graph including at least one hierarchical task having pointers to a plurality of sub-task graphs, wherein an XOR relationship exists between at least two of the plurality of sub-task graphs;

processing said initial master task graph to provide a selected number of final master task graphs, each of said final master task graphs comprising a list of AND task graphs;

generating a family of architectures for each of said final master task graphs, each of the architectures generated for a given final master task graph being capable of executing every AND task graph included in the list for the given final master task graph; and exploring each of said generated architectures for use in executing said multiple specifications.

2. The method of claim 1 wherein:

said initial master task graph includes a first hierarchical task having an AND attribute, and a second hierarchical task having an XOR attribute.

3. The method of claim 2 wherein said processing step comprises:

resolving said initial master task graph into sets of AND task graphs on the basis of respective sub-task graphs associated with said first hierarchical task; and resolving said sets of AND task graphs into said final master task graphs.

4. The method of claim 1 wherein:

said given final master task graph is applied to an architecture synthesis engine to generate a family of architectures therefor.

5. The method of claim 1 wherein said exploring step comprises:

placing each of the architectures generated for said given final master task graph into a pool; and retaining a particular architecture in said pool only if said particular architecture can execute each AND task graph of said given final master task graph in accordance with a prespecified time schedule.

6. The method of claim 1 wherein:

a generated architecture is disposed to execute specified multiple tasks from said multiple specifications on a single component that is selected from said set of resources.

7. The method of claim 1 wherein:

a generated architecture is disposed to execute specified multiple tasks from said multiple specifications on the same type, but different instances, of a component that is selected from said set of resources.

8. An article of manufacture for generating system level architectures that are capable of executing multiple functional specifications, given a set of physical resources, and subject to a set of design constraints, said article of manufacture comprising:

a computer readable medium;

a plurality of instructions wherein at least a portion of said plurality of instructions are storable in said computer readable medium, and further wherein said plurality of instructions are configured to cause a processor to:

form an initial master task graph from said multiple specifications, said initial master task graph including at least one hierarchical task having pointers to a plurality of sub-task graphs, wherein an XOR relationship exists between at least two of the plurality of sub-task graphs;

process said initial master task graph to provide a selected number of final master task graphs, each of said final master task graphs comprising a list of AND task graphs;

generate family of architectures for each of said final master task graphs, each of the architectures generated for a given final master task graph being capable of executing every AND task graph included in the list for the given final master task graph; and explore each of said generated architectures for use in executing said multiple specifications.

9. The article of manufacture of claim 8 wherein:

said initial master task graph includes a first hierarchical task having an AND attribute, and a second hierarchical task having an XOR attribute.

10. The article of manufacture of claim 9 wherein said processing step comprises;

resolving said initial master task graph into sets of AND task graphs on the basis of respective sub-task graphs associated with said first hierarchical task; and resolving said sets of AND task graphs into said final master task graphs.

11. The article of manufacture of claim 8 wherein:

said given final master task graph is applied to an architecture synthesis engine to generate a family of architectures therefor.

12. The article of manufacture of claim 8 wherein said exploring step comprises:

placing each of the architectures generated for said given final master task graph into a pool; and retaining a particular architecture in said pool only if said particular architecture can execute each AND task graph of said given final master task graph in accordance with a prespecified time schedule.

13. The article of manufacture of claim 8 wherein:

a generated architecture is disposed to execute specified multiple tasks from said multiple specifications on a single component that is selected from said set of resources.

14. The article of manufacture of claim 8 wherein:

a generated architecture is disposed to execute specified multiple tasks from said multiple specifications on the same type, but different instances, of a component that is selected from said set of resources.

* * * * *